United States Patent [19]

Grube et al.

[11] Patent Number: 5,125,103
[45] Date of Patent: Jun. 23, 1992

[54] AUTOMATIC CONTROL CHANNEL ACQUISITION METHOD AND APPARATUS IN A TRUNKED COMMUNICATION SYSTEM

[75] Inventors: Gary W. Grube, Palatine; Richard G. Day, Jr., Roselle, both of Ill.

[73] Assignee: Motorola, Inc., Schaumburg, Ill.

[21] Appl. No.: 516,419

[22] Filed: Apr. 30, 1990

[51] Int. Cl.$^5$ .............................................. H04Q 7/00
[52] U.S. Cl. ................................ 455/33.1; 455/166.2; 379/63
[58] Field of Search ........................ 455/33, 34, 38, 53, 455/54, 56, 161, 166; 379/58, 59, 60, 63; 340/825.5

[56] References Cited

U.S. PATENT DOCUMENTS 4,716,407 12/1987 Borras et al. ........................ 455/166
4,866,710 9/1989 Schaeffer .............................. 455/33
4,905,301 2/1990 Krolopp et al. ..................... 455/166
4,939,746 7/1990 Childress ............................... 455/33

Primary Examiner—Curtis Kuntz
Attorney, Agent, or Firm—Darleen J. Stockley

[57] ABSTRACT

A trunked communication system automatic system resource acquisition method and apparatus provide for utilizing dual system resource listings to monitor for priority communications within a primary geographic communication control area. System resources on a second listing have secondary geographic coverage areas substantially within a primary geographic communication control area, allowing communication units to receive priority transmission preferentially from secondary control system resources in a first listing and secondarily from primary control system resources in a second listing when secondary control system resources are not available.

46 Claims, 3 Drawing Sheets

AUTOMATIC CONTROL CHANNEL ACQUISITION METHOD AND APPARATUS IN A TRUNKED COMMUNICATION SYSTEM

BACKGROUND OF THE INVENTION

The invention relates to trunked radio communication systems. Specifically this invention provides a method and apparatus for allowing automatic system resource acquisition by utilizing dual system resource listings when monitoring priority communications within a particular geographic communication coverage area.

Trunked communication systems provide an efficient use of limited frequency spectrum. In a trunked communication system a primary communication control resource (PCCR) allocates a limited number of system resources among many communication units (CUs). System resources are typically RF (ratio frequency) channels such as frequencies, frequency pairs, or TDM time slots. The PCCR continuously sends an outbound signalling word (OSW) stream to the CUs, and a CU sends an inbound signaling word (ISW) to the PCCR when a system resource is desired. Since the number of system resources is far less than the number of CUs, the PCCR typically monitors previously assigned resources. When a system resource remains unused for a predetermined period of time, the PCCR typically makes the system resource available for use by other CUs.

In the past, a system resource has been available from a control resource's single listing. To provide for a functional priority monitoring system, typically an alarm system, manual input from the priority monitoring system is transmitted to control resource, and the control resource, when desired, alerts a CU as to the priority monitoring system status. In this way CUs are alerted to an alarm type and location. Such a procedure does not allow for integration of a control resource based communication system and a priority monitoring system. A need exists for integrating priority monitoring reporting into a single trunked communication system, thus reducing total cost and complexity.

SUMMARY OF THE INVENTION

The need for integration of priority monitor reporting into a single trunked communication system to facilitate more rapid dissemination of priority device status to CUs and other needs are substantially met by the present invention.

Briefly, according to the invention, a trunked communication automatic system resource acquisition method and apparatus are provided that utilize at least dual system resource listings. System resource listings may or may not overlap. The trunked communication system has at least a limited number of system resources, a plurality of CUs, at least one PCCR per first geographic communication coverage area, and at least one secondary communication control resource (SCCR) per secondary geographic communication coverage area (SG).

The first geographic communication control area encompasses at least the secondary geographic communication control area. Each SCCR has a first listing of system resources containing at least one system resource. Each PCCR, like a parent, has a second system listing of resources containing at least one system resource, and controls the SCCRs within its geographic communication control area, a parent area. The system resource frequency of the SCCRs for a PCCR parent area is essentially different from that of the PCCR parent itself, but may be that of other SCCRs where there is no overlapping SCCR coverage.

Associated with each SCCR is a priority radio unit, a low power trunked radio within range of the SCCR. Associated with each priority radio unit is at least one priority device. Upon receiving a priority status transmission from a priority device, the priority radio unit utilizes the SCCR for transmitting priority event detection. The priority event detection is automatically transmitted to CUs in the SG and to the parent PCCR.

Where a CU is either within a SG or within a parent PCCR area having no SGs, a CU scans available system resources for detection of a priority event, first seeking a system resource from a SCCR's first listing of system resources. Upon determining that no system resource in the SCCR's first listing of system resources is available, the CU then searches for a system resource in a PCCR's second listing of system resources. The method and apparatus provide for automatic acquisition of a system resource in a first listing when one is available, and automatic acquisition of a system resource in a second listing, if available, when no system resource is available in the first listing. Recycling permits a CU to continue to iteratively check both listings when no system resource is immediately available on either listing. Since each SCCR has substantially a same outbound signalling word stream as its parent PCCR plus a unique site identification, a CU receives parent PCCR area transmission while determining its location relative to SCCRs, or at least a parent PCCR when no SCCRs are within range.

DETAILED DESCRIPTION OF THE PREFERRED EMBODIMENT

Figure 1:
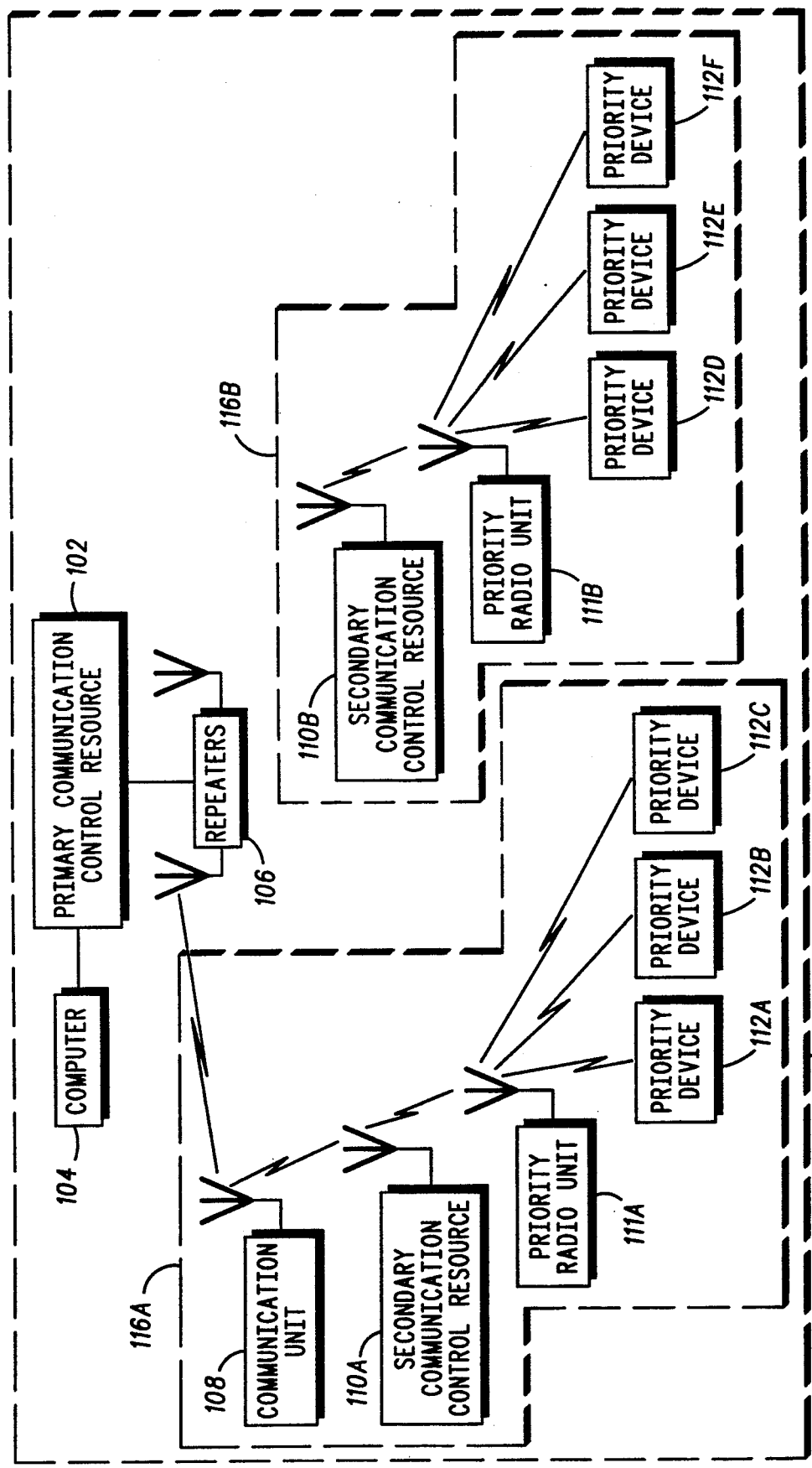
FIG. 1 is a block diagram of a trunked communication system utilizing dual system resource listings to monitor for priority communications within a primary geographic communication control area.

FIG. 1 illustrates at least one CU (108) utilizing at trunked communication system that has at least one first listing of system resources per secondary communication control resource (SCCR) (110A, 110B) and at least one second listing system resources per a PCCR (102) to monitor a priority device (112 A-f) system, wherein each such system has a priority radio unit (111A, 111B) supporting at least one priority device. A first and a second listing are typically predetermined groups of radio frequencies. A priority device is typically an alarm unit. An alarm unit is a device utilized to designate priority-nonpriority status f a selected detectable event such as presence of an emergency, an intruder, smoke, fire, water flow, change in water level, change in temperature or the like.

A first geographic communication coverage area (114) is served by at least one PCCR (102). Each first geographic communication coverage area includes at least one secondary geographic communication control area (116A, 116B). At least one SCCR serves each secondary geographic communication control area. Each SCCR has a first listing of system resources, and each PCCR has a second listing of system resources. Each listing of system resources comprises at least one system resource. System resources are typically RF channels.

A local area is a secondary geographic communication control area, located substantially within a primary geographic communication control area, and having a SCCR that transmits substantially a same OSW stream as that transmitted by the PCCR, except that each SCCR transmits a site identification (site ID) unique to that SCCR. Since each SCCR system resource receives substantially the same OSW stream and voice channel assignments as the PCCR serving the first geographic communication coverage area of that SCCR, an SU may scan PCCR system activity while locking onto a system resource, preferably from a SCCR, and registering its location with the PCCR from that geographic location.

Priority devices, typically stationary, low power alarm units, are placed in at least one local area to provide detection of at least one selected event and are each typically designated by a specific geographic device identification (GDI). Upon either a priority device's detecting a selected event or upon a manual initiation of indication of a priority status condition, a priority device automatically transmits that priority status condition. A priority device is monitored by at least one PCCR, and may be monitored by any CU within the secondary geographic communication area for the local area of that priority device. The PCCR may direct selected CU's in the local area of the priority device transmitting the priority status condition to respond to the area of that priority device. Although only six priority devices, one PCCR, one CU, two priority radio units, and two SCCRs are shown, various numbers of each could be utilized within the system described by this invention. Also, although the priority devices (112A-F) and the priority radio units (111A, 111B) are depicted as communicating by a radio communication system, it will be obvious to one skilled in the art that priority devices could be hard-wired to a priority radio unit (111A, 111B). Similarly, any desired number of PCCRs and CUs could be utilized in the present invention.

The trunked communication system provides at least voice dispatch, RF channel assignment, and priority monitoring functions. At least one system resource is available for signalling priority status for priority devices.

The PCCR (102) includes a computer (104) that enables the PCCR (102) to utilize computer-aided-dispatch, as is known in the art. Repeaters (106) at the PCCR (102) allow a second listing of system resources to be made available to a CU (108) on a trunked basis. Although only two SCCRs are shown, such control resources may be considerably more numerous, as desired and needed within a particular first geographic communication control area. At least one SCCR (110A, 110B) transmits a first listing of system resoures having at least one system resource.

A CU (108) preferentially determines if a system resource, typically a RF control channel, is available from a SCCR's first listing by typically proceeding to scan radio frequencies to check the availability of each system resource on that first listing, and locks in the first available system resource on the first listing. If no system resource is available on the first listing, the CU (102) determines if a system resource is available from a PCCR's second listing by proceeding to check the availability of each system resource on that second listing, and locks in the first available system resource on the second listing. The CU also registers the selected system resource with the PCCR. If no system resource is available on either listing, the CU repetitively recycles the procedures described above until obtaining a system resource.

Figure 2A:
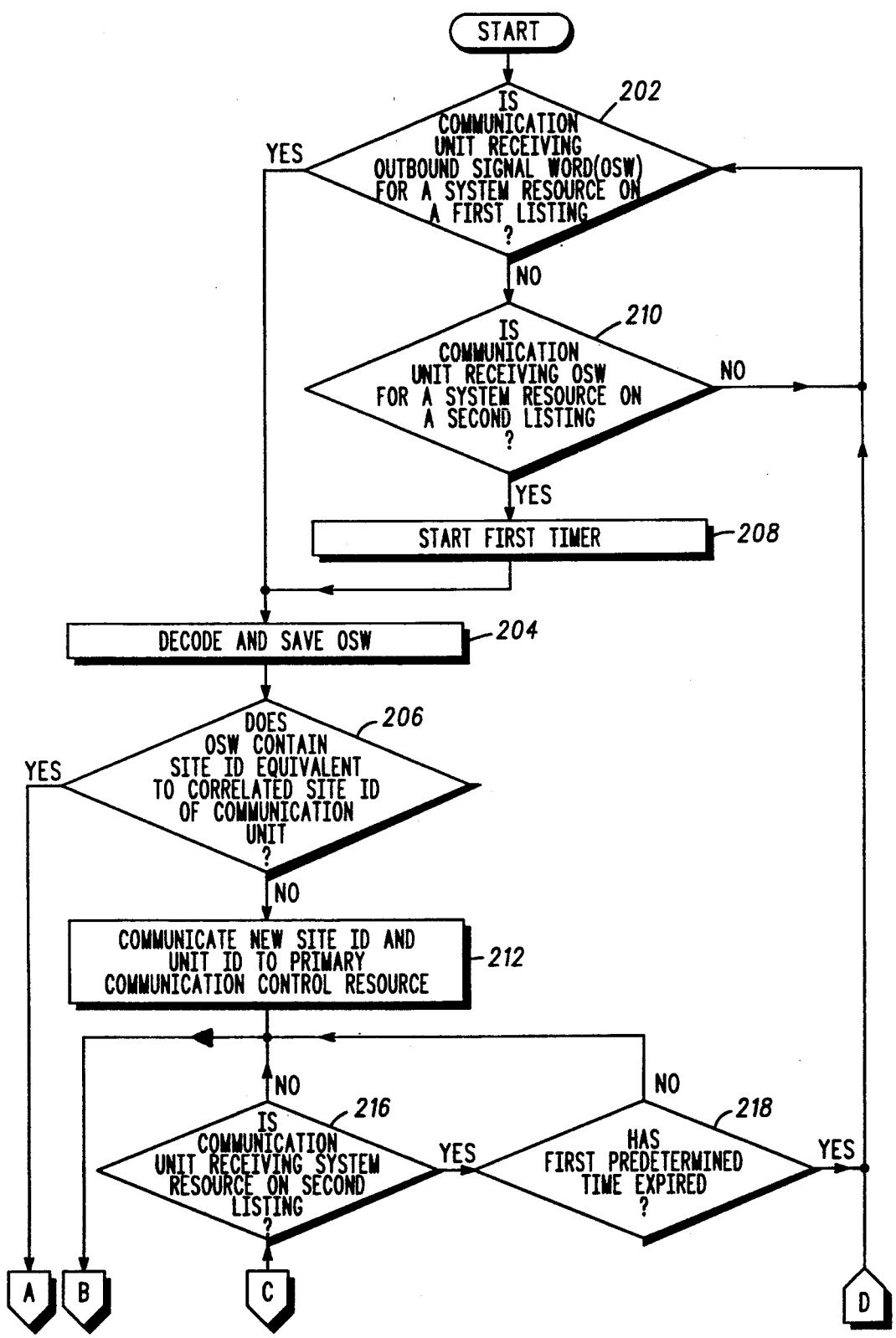
FIGS. 2A and B are flow diagrams illustrating a logic and stepwise implementation of an interactive trunking and priority monitoring communication system.
Figure 2B:
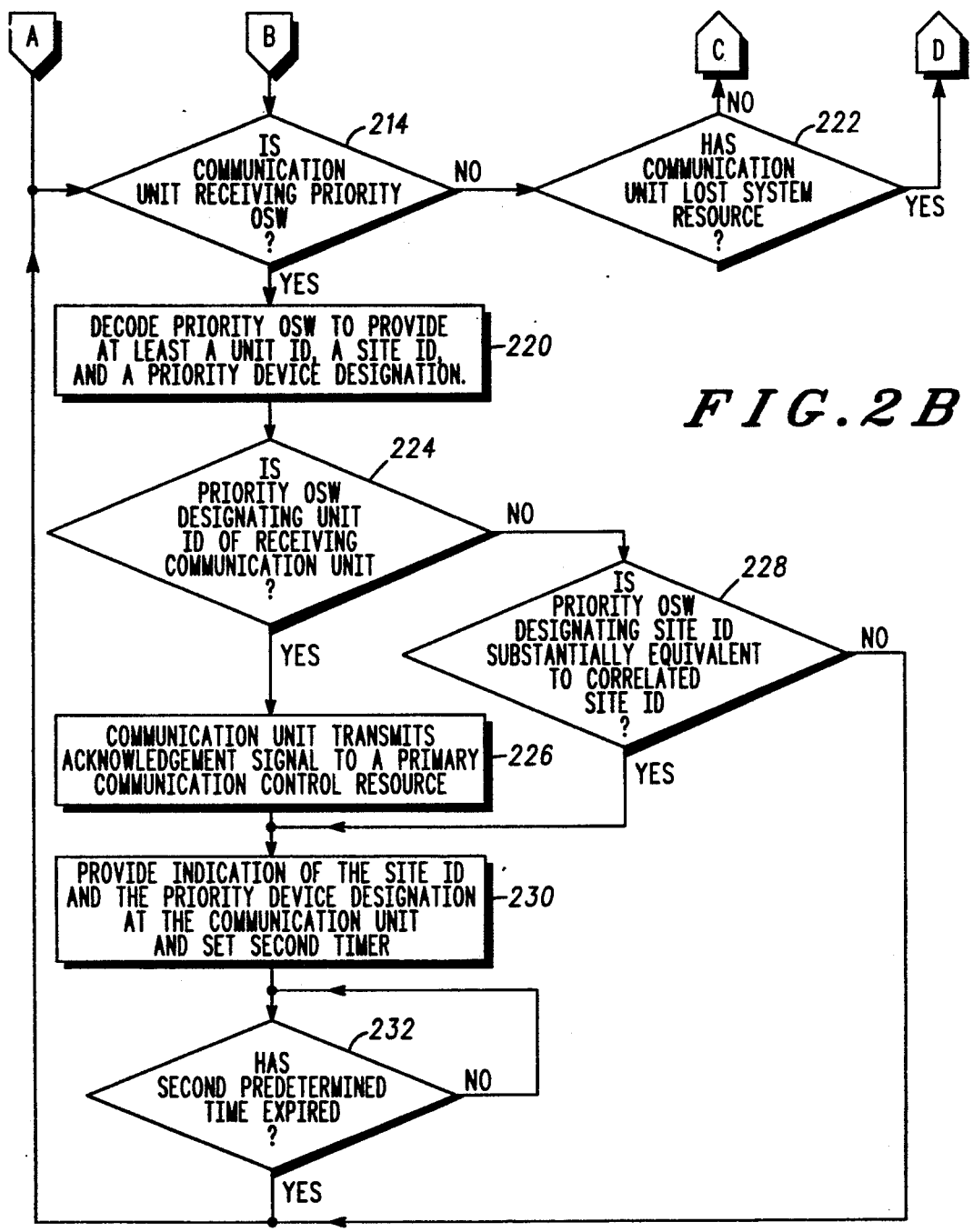

FIG. 2A and 2B more specifically set forth the logic and implementation of a system in accordance with the present invention, wherein a CU entering a secondary geographic communication control area substantially scans a first listing from a SCCR in that secondary geographic communication control area to obtain a system resource, then, if no system resource is found, scans a second listing from the PCCR serving that SCCR for a system resource, and if no system resource is found, reiterates the preceding steps until a system resource is found. Upon finding a system resource, the CU registers its present location with a parent PCCR serving its area by transmitting its identification and the system resource being utilized. When a CU is operating in an area served only by a PCCR, and no SCCR is within that CU's range, the CU utilizes the second listing of that PCCR.

At least one PCCR serves a first geographic communication coverage area that encompasses, substantially, at least one second geographic communication coverage area of at least one SCCR. Each CU, there being at least one, utilizing this invention, is assigned a unit identification designation (unit ID). Further, upon a CU's automatically registering its location with a PCCR, the CU is assigned at least one correlated site identification designation (correlated site ID) to substantially describe that unit's location within at least one specific geographic communication coverage area, being at least one of: an identification designation of a site of a first geographic coverage area of a PCCR; and an identification designation of a site of a second geographic coverage area of a SCCR.

A computer is utilized by a PCCR for efficient control resource and CU interaction. Typically at least one system resource is assigned for use by priority devices. A CU implements a first searching for a system resource from a SCCR's first listing of system resources, determining whether or not that CU is receiving an outbound signal word (OSW) for a system resource on that first listing, and automatically acquiring a first available system resource on that first listing (202). The first listing substantially includes at least one system resource of a SCCR.

If the CU is not receiving such an OSW, that CU implements a second searching for a system resource on a PCCR's second listing of system resources, determining whether or not that CU is receiving an OSW for a system resource on the second listing of system resources and automatically acquiring a first available system resource on that second listing (210). The second listing substantially includes at least one system resource of a PCCR. If no OSW is being received allotting a system resource from either the first or second listing, the CU continuously recycles iteratively through both listing to redetermine availability of a system resource, automatically acquiring a first available system resource.

If an OSW is being received that allots a system resource from a second listing, the CU starts a first timer (208).

Upon either starting a first timer (208) or determining that a system resource is available from a first listing (202), a CU substantially decodes and stores a received OSW (204). That OSW includes at least one site ID, being at least one of: a primary site ID and a secondary site ID. A primary site ID includes at least an identification designation of a site of a PCCR having a first geographic communication coverage area. A secondary site ID includes at least an identification designation of a site of a SCCR having a SG.

A CU determines whether or not a received OSW contains a site ID substantially equivalent to a correlated site ID (206). When a site ID received is not substantially equivalent to any correlated site ID, a CU communicates any received site ID and a CU ID to a PCCR (212).

Upon one of:
communicating any received site ID and a CU ID to a PCCR (212); and
determining that a received OSW contains a site ID substantially equivalent to a correlated site ID (206); a CU determines whether it is receiving a priority OSW (214). If will be obvious to one skilled in the art that the step of determining whether a CU is receiving a priority OSW and the associated priority monitoring system are adaptable to implementation at a different location in the logic pattern of the present invention, for example, prior to decoding and saving an OSW (204).

When a CU is receiving a priority OSW (214), that CU implements the step of decoding that priority OSW to provide at least a unit ID, a site ID, and a priority device designation (220). A priority device designation includes at least a priority unit location identification designation. When a priority OSW designates the unit ID of a CU receiving that priority OSW (224), that CU communicates an acknowledgement signal to a PCCR (226). When a priority OSW does not designate the unit ID of a CU receiving that priority OSW, that CU implements the step of determining whether that priority OSW designates a site ID substantially equivalent to a correlated site ID of that CU (228). When a CU determines that a priority OSW does not designate a site ID substantially equivalent to a correlated site ID of that CU, that unit recycles to reimplement the step of determining whether that CU is receiving a priority OSW (214).

When one of:
determination that a priority OSW designates a site ID substantially equivalent to a correlated site ID of that CU (228); and
communication of an acknowledgement by a CU when a priority OSW designates a unit ID substantially equivalent to the unit ID of that CU (224);
the received site ID and the priority device designation are indicated at the CU, and the CU sets a second timer (230).

Receipt of the site ID and the priority device designation enables a CU to respond, if desired, in accordance with a given priority OSW. After setting the second timer, the CU determines whether a second predetermined time expired (232). When that predetermined time has not yet expired, the CU recycles iteratively to redetermine same until that second predetermined time has expired at which time the CU recycles (232) to reimplement the step of determining whether that CU is receiving a priority OSW (214).

When a CU determines that it is not receiving a priority OSW (214), the CU determines whether it has lost a system resource (222). When that CU has lost a system resource, that unit recycles to determining whether it is receiving a system resource on a SCCR's first listing (202), iteratively recycling as set forth previously. When a CU determines that a system resource has not been lost (222), that unit determines whether that unit is receiving a system resource on a PCCR's second listing (216). When that CU determines that a system resource on a second listing is being received (216), that unit determines whether a first predetermined time has expired (218). When a first predetermined time has expired (218), the CU recycles to determining whether it is receiving a system resource on a first listing (202), iteratively recycling as set forth previously. When one of:

a CU determines that a system resource on a second listing is not being received (216); and
a CU determines that a first predetermined time has not expired;
that CU recycles to determining whether a priority OSW is being received (214).

Figure 3:
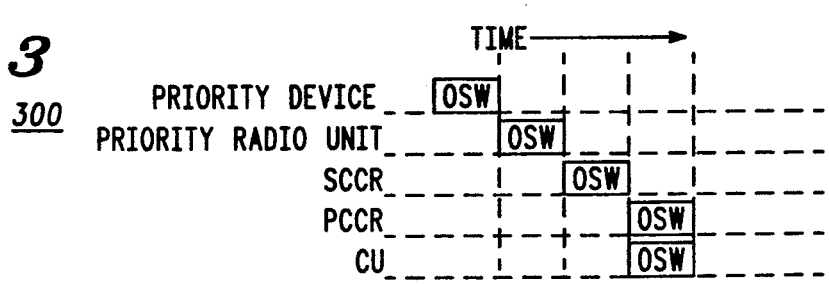
FIG. 3 is a timing diagram setting forth one embodiment of an initiation of a priority status condition at a priority device and transmissions of that status condition to components utilizing the present invention.

FIG. 3, generally depicted as a numeral 300, sets forth one embodiment of transmission of an initiated priority status condition at a priority device to components utilizing the present invention. In step A, a priority device initiates transmission of a priority status condition. Such transmission may utilize a hard-wire connection to or a radio communication with a priority radio unit. The priority radio unit transmits the priority status condition to a SCCR. The SCCR, typically a low power unit, transmits the priority status condition, including the site identification of that SCCR. A parent PCCR and a CU in the SG for that SCCR may receive the priority status condition. The PCCR retransmits the priority condition status together with the sit identification for the SCCR in that SG. The CU may receive the priority status condition and site identification on a first listing of system resources from the SCCR in that SG, or if no SCCR is available therein, from the parent PCCR of that SG. The PCCR may transmit directions for specific CUs in a given area to respond to a particular priority status condition.

An apparatus for implementing the present invention is set forth, designating units that utilize the method heretofore described.

We claim:

1. A method for automatically acquiring, at least in part, a system resource for a trunked communication system having a limited number of system resources, a plurality of communication units, at least one primary communication control resource having a first geographic communication coverage area, and at least one secondary communication control resource, wherein at least two system resource listings are utilized, the method comprising the steps of:

A) a first searching for a system resource in a first listing of system resources
wherein the first searching comprises at least the steps of:
1A) first seeking a system resource on a first listing;
1B) second seeking a next system resource on the first listing when a system resource previously sought on the first listing is not available;

1C) reiterating steps (1A) and (1B) above until one of:
finding at least one available system resource on the first listing; and
finding that all system resources in the first listing are not available;
B) a second searching for a system resource in a second listing of system resources when no system resource is available in the first listing
wherein the second searching comprises at least the steps of:
2A) first seeking a system resource on a second listing;
2B) second seeking a next system resource on the second listing when a system resource previously sought on the second listing is not available;
2C) reiterating steps (2A) and (2B) above until one of finding at least one available system resource on the second listing; and
finding that all system resources in the second listing are not available; and
C) automatically acquiring at least one system resource relative to searching in at least one listing.

2. The method of claim 1, wherein at least one secondary communication control resource is located within a first geographic communication coverage area of a primary control resource.

3. The method of claim 1, further including a step of assigning a unit identification designation to each communication unit.

4. The method of claim 1, further including a step of assigning at least one correlated site identification designation to each communication unit.

5. The method of claim 1, wherein a correlated site identification designation is a site identification designation corresponding to at least one second geographic communication control area within which a communication unit is located at a selected time.

6. The method of claim 1, wherein a primary communication control resource further includes a computer-aided-dispatch unit.

7. The method of claim 1, wherein the step of a first searching for a system resource in a first listing includes searching a first listing containing at least one predetermined system resource relative to at least one secondary communication control resource.

8. The method of claim 1, wherein the step of a second searching for a system resource in a second listing of system resources when no system resource is available in the first listing includes searching a second listing containing at least one predetermined system resource relative to at least one primary communication control resource.

9. The method of claim 1, wherein a system resource includes at least a control resource frequency.

10. The method of claim 1, wherein, when all system resources in the second listing are not available, further comprising a step of a first recycling to a first search for a system resource in a first listing.

11. The method of claim 1, wherein, when at least one system resource in the second listing is available, further comprising a step of setting a first timer.

12. The method of claim 1, wherein the step of automatically acquiring at least one system resource relative to searching in at least one listing includes the step of a communication unit receiving an outbound signaling word from a primary communication control resource for automatically acquiring at least one control resource frequency by that communication unit.

13. The method of claim 12, wherein the step of receiving an outbound signaling word further includes the step of receiving an outbound signaling word indicating at least one side ID.

14. The method of claim 13, wherein the step of receiving an outbound signaling word indicating at least one site ID includes one of the steps of:
receiving an outbound signaling word indicating at least a primary site ID; and
receiving an outbound signaling word indicating at least a secondary site ID.

15. The method of claim 14, wherein a primary site ID includes at least an identification designation of a site of a first geographic coverage area of a primary communication control resource.

16. The method of claim 14, wherein a secondary site ID includes at least an identification designation of a site of a second geographic coverage area of a second communication control resource.

17. The method of claim 13, further including a step of storing by the primary communication control resource the at least one site ID and the unit identification designation of the communication unit receiving the at least one site ID.

18. The method of claim 12, further comprising at least the steps of:
A) decoding and storing the outbound signal word containing at least one site ID;
B) comparing the site ID with a correlated site ID;
C) communicating, when the site ID is different from any correlated site ID, at least one received site ID and the unit identification designation of that communication unit to a primary communication control resource;
D) primary searching for a priority outbound signal word upon one of:
ascertaining that an outbound signal word site ID is equivalent to a correlated site ID of the communication unit; and
ascertaining that an outbound signal word site ID is not equivalent to a correlated site ID of the communication unit;
E) first determining, when the communication unit is not receiving a priority outbound signal word, whether or not a receipt of a system resource from the first listing has been lost;
F) second recycling, when the receipt of an acquired system resource has been lost, to the step of a first searching for a system resource in a first listing;
G) second determining, when the receipt of an acquired system resource has not been lost, whether or not the system resource acquired has been acquired from the second listing;
H) recycling, when a system resource has not been acquired from a second listing, to the first determining of whether or not receipt of a system resource from the first listing has been lost;
I) third determining, when a system resource from a second listing has been acquired, whether or not a predetermined time has elapsed since automatically acquiring a system resource from a second listing;
J) recycling, when a first predetermined time has elapsed since acquiring a system resource from a second listing, to the step of a first searching for a system resource in a first listing;
K) cycling, when a first predetermined time has not elapsed since acquiring a system resource from a second listing, to the step of primary searching for a priority outbound signal word.

19. The method of claim 18, wherein a correlated site ID is one of:
- an identification designation of a site of a primary communication control resource; and
- an identification designation of a site of a secondary communication control resource.

20. The method of claim 18, wherein a priority outbound signal word includes at least one unit identification designation, at least one site ID, and at least one priority device designation.

21. The method of claim 20, wherein a priority device designation includes at least a priority unit location identification designation.

22. The method of claim 18, wherein primary searching for a priority outbound signal word further includes:
A) recycling, when no priority outbound signal word is detected, to first determining whether or not a receipt of a system resource from the first listing has been lost;
B) decoding a priority outbound signal word to provide at least a unit identification designation, a site ID, and a priority device designation, when a communication unit receives a priority outbound signal word;
C) determining, when a communication unit receives a priority outbound signal word, whether or not the priority outbound signal word designates the unit identification designation of that communication unit;
D) transmitting an acknowledgement to a primary communication control resource when a communication unit receives a priority outbound signal word designating the unit identification designation of that communication unit;
E) determining, when a communication unit does not receive a priority outbound signal word designating the unit identification designation of that communication unit, whether or not a site ID equivalent to a correlated site identification designation is received;
F) recycling to primary searching for a priority outbound signal word when a site ID equivalent to a correlated site identification designation is not received;
G) providing an indication of a site ID and a priority device designation at a communication unit, the communication unit providing a responsive action to the priority OSW if desired, and the communication unit setting a second timer, upon one of the steps:
- transmitting an acknowledgement signal to a primary communication control resource from a communication unit; and
- receiving a site ID equivalent to a correlated site identification designation;
H) determining whether or not a second predetermined time has expired;
I) recycling to primary searching for a priority outbound signal word when a second predetermined time has expired; and
J) recycling to determining whether or not a second predetermined time has expired when a second predetermined time is determined not to have expired.

23. The method of claim 1, wherein the step of automatically acquiring a system resource relative to searching in at least one listing further includes one of the steps:
- automatically acquiring a system resource in the first listing when a system resource sought on the first listing is available; and
- automatically acquiring a system resource in the second listing when a system resource sought on the first listing is not available.
- automatically recycling to a first searching for a system resource in a first listing of system resources when a system resource sought on the second listing is not available.

24. An apparatus for automatically acquiring, at least in part, a system resource for a trunked communication system having a limited number of system resources, a plurality of communication units, at least one primary communication control resource having a first geographic communication coverage area, and at least one secondary communication control resource, wherein at least two system resource listing are utilized, the apparatus comprising:
A) first searching means for seeking a system resource in a first listing of system resources
wherein the first searching means comprises at least
1A) primary searching means for at least seeking acquisition of a system resource on a first listing;
1B) secondary searching means, responsive to primary searching means, for at least seeking acquisition of a next system resource on the first listing when a system resource previously sought on the first listing is not available; and
1C) primary reiteration means, responsive to the primary searching means and the secondary searching means, for at least iteratively utilizing the primary searching means until all system resources on the first listing have been determined to be not available;
B) second searching means, responsive to first searching means, for seeking a system resource in a second listing of system resources when no system resource is obtained in the first listing
wherein the second searching means comprises at least;
2A) tertiary searching means for at least seeking to acquire a system resource on a second listing;
2B) quaternary searching means, responsive to the tertiary searching means, for at least seeking to acquire a next system resource on the second listing when a system resource previously sought on the second listing is not available;
2C) secondary reiteration means, responsive to the tertiary searching means and the quaternary searching means, for reiteration of the use of those means until one of:
- locating at least one available system resource on the second listing; and
- finding that all system resources in the second listing are not available; and
C) first automatic acquisition means, responsive to first searching means and second searching means for automatic acquisition of at least one system resource relative to searching in at least one listing.

25. The apparatus of claim 24, wherein at least one secondary communication control resource is located within a first geographic communication coverage area of a primary control resource.

26. The apparatus of claim 24, further including a first assignment means for substantially assigning a unit identification designation to each communication unit.

27. The apparatus of claim 24, further including a second assignment means for assigning at least one correlated site identification designation to each communication unit.

28. The apparatus of claim 24, wherein a correlated site identification designation is a site having a geographic communication coverage area within which a communication unit is located at a selected time.

29. The apparatus of claim 24, wherein a primary communication control resource further includes a computer-aided-dispatch unit.

30. The apparatus of claim 4, wherein the first listing contains at least one predetermined system resource for at least one secondary communication control resource.

31. The apparatus of claim 24, wherein the second listing contains at least one predetermined system resource for at least one primary communication control resource.

32. The apparatus of claim 24, wherein a system resource includes at least a control resource frequency.

33. The apparatus of claim 24, wherein, when all system resources in the second listing are not available, further including a first recycling means for at least recycling to a first searching means for seeking a system resource in a first listing of system resources.

34. The apparatus of claim 24, further including a step of setting a first timer when at least one system resource in the second listing is available.

35. The apparatus of claim 34, wherein an outbound signaling word further includes at least a site ID.

36. The apparatus of claim 35, wherein a site ID further includes at least one of:
   at least a primary site ID; and
   at least a secondary site ID.

37. The apparatus of claim 36, wherein a primary site ID further includes at least an identification designation of a site of a primary communication control resource.

38. The apparatus of claim 36, wherein a secondary site ID further includes at least an identification designation of a site of a secondary communication control resource having a second geographic communication coverage area with a first geographic communication coverage area.

39. The apparatus of claim 35, further including a primary communication control resource storage means for storing the at least one site ID and the unit identification designation.

40. The apparatus of claim 35, further comprising at least:
   A) first decoding and storing means, for at least decoding and storing an outbound signal word containing at least one site ID;
   B) first comparison means, responsive to the first decoding and storing means and second assignment means, for at least comparing a received site ID from an outbound signal word with a correlated site identification designation for that communication unit;
   C) first communication means, responsive to the first comparison means, for, when the site ID is different from any correlated site identification designation, at least transmitting at least one site ID and a unit identification designation of that communication unit to a primary communication unit;
   D) fourth searching means, responsive to first communication means and first comparison means, for searching for a priority outbound signal word by a communication unit upon receipt of at least one outbound signal word site ID;
   E) first determining means, responsive to the first comparison means, for, when the site ID is equivalent to the correlated site ID, at least determining whether or not a receipt of a system resource has been lost;
   F) second recycling means, responsive to the first determining means, for, when the receipt of a system resource has been lost, recycling to a first searching means;
   G) second determining means, responsive to the first determining means, for, when the receipt of a system resource has not been lost, determining whether or not the system resource is from the second listing;
   H) third recycling means, responsive to the second determining means, for, when a system resource has not been acquired from the second listing, recycling to the first determining means;
   I) third determining means, responsive to the second determining means, for, when a system resource from the second listing has been acquired, determining whether or not a first predetermined time has elapsed since automatically acquiring a system resource from the second listing;
   J) fourth recycling means, responsive to the third determining means, for, when a first predetermined time has elapsed since automatically acquiring a system resource from the second listing, recycling to the first searching means; and
   K) cycling means, responsive to the third determining means, for, when a first predetermined time has not elapsed since automatically acquiring a system resource from the second listing, cycling to fourth searching means by a communication unit for a priority outbound signal word.

41. The apparatus of claim 40, wherein a correlated site identification designation is one of:
   an identification designation of at least a site of a primary communication control resource; and
   an identification designation of at least a site of a secondary communication control resource.

42. The apparatus of claim 39, wherein a priority outbound signal word includes at least one unit identification designation, at least one site ID, and at least one priority device designation.

43. The apparatus of claim 42, wherein a priority device designation includes at least a priority unit location identification designation.

44. The apparatus of claim 39, further including at least;
   A) primary recycling means by a communication unit, when no priority outbound signal word is detected, for recycling to the firsts determining means;
   B) second decoding and storing means, responsive to the primary recycling means, for decoding and storing a priority outbound signal word by a communication unit to provide at least a unit identification designation, a site ID, and a priority device designation, when the communication unit receives a priority outbound signal word;
   C) fourth determining means, responsive to fourth searching means, for, when a communication unit receives a priority outbound word signal, determining whether or not the priority outbound signal word designates the unit identification designation of that communication unit;

D) second transmission means, responsive to the second decoding means and fourth determining means, for transmitting an acknowledgement to a primary communication control resource when a communication unit receives a priority outbound signal word designating the unit identification designation of that communication unit;

E) fifth determining means, responsive to fourth determining means for, when a communication unit does not receive a priority outbound signal word designating the unit identification designation of that communication unit, determining whether or not a site ID equivalent to a correlated site identification designation is received;

F) secondary recycling means, responsive to fifth determining means, for recycling to primary searching for a priority outbound signal word when a site ID equivalent to a correlated site identification designation is not received;

G) indication means, responsive to fifth determining means and second transmission means, for indicating of a site ID and a priority device designation at a communication unit such that the communication unit may respond to the priority outbound signal word if desired, and for setting a second timer, upon one of:

transmission of an acknowledgement signal to a primary communication control resource from a communication unit; and reception of a site ID equivalent to a correlated site identification designation;

H) sixth determining means, responsive to indication means, for determining whether or not a second predetermined time has expired;

I) tertiary recycling means, responsive to sixth determining means, for recycling to primary searching for a priority outbound signal word when a second predetermined time has expired; and J) quaternary recycling means, responsive to sixth determining means, for recycling to the sixth determining means for determining whether or not a second predetermined time has expired when a second predetermined time is determined not to have expired.

45. The apparatus of claim 24, wherein the first automatic acquisition means further includes at least one of:

second automatic acquisition means for automatically acquiring a system resource in the first listing when a system resource sought on the first listing is available;

third searching means, responsive to the second automatic acquisition means, for automatically acquiring a system resource in the second listing when a system resource sought on the first listing is not available; and fourth automatic acquisition means, responsive to the third automatic acquisition means, for automatically acquiring first searching means for seeking a system resource in a first listing of system resources when a system resource sought on the second listing is not available.

46. The apparatus of claim 24, wherein the first automatic acquisition means further includes at least a first reception means for a communication unit reception of an outbound signaling word from a primary communication control resource for automatic acquisition of at least one control resource frequency by that communication unit.

* * * * *

UNITED STATES PATENT AND TRADEMARK OFFICE
CERTIFICATE OF CORRECTION

PATENT NO. : 5,125,103

DATED : June 23, 1992

INVENTOR(S) : Gary W. Grube and Richard G. Day, Jr.

It is certified that error appears in the above-identified patent and that said Letters Patent is hereby corrected as shown below:

Column 10, Line 22: "listing" should be --listings--

Signed and Sealed this

Seventeenth Day of August, 1993

Attest:

BRUCE LEHMAN

Attesting Officer    Commissioner of Patents and Trademarks